United States Patent [19]

Reber

[11] Patent Number: 4,681,679
[45] Date of Patent: Jul. 21, 1987

[54] FILTERING DEVICE FOR SEPARATING SOLIDS FROM LIQUIDS

[76] Inventor: Hans Reber, Wartburgstrasse 5, D-7410 Reutlingen-Sickenhausen, Fed. Rep. of Germany

[21] Appl. No.: 713,272

[22] Filed: Mar. 18, 1985

[30] Foreign Application Priority Data

Mar. 17, 1984 [DE] Fed. Rep. of Germany ....... 3409826

[51] Int. Cl.$^4$ .................... B01D 33/04; B01D 33/14
[52] U.S. Cl. .................... 210/107; 210/122; 210/387; 210/396
[58] Field of Search ............... 210/387, 396, 401, 403, 210/107, 122, 386, 297, 298

[56] References Cited

U.S. PATENT DOCUMENTS

| | | | |
|---|---|---|---|
| 620,786 | 3/1899 | Koerper et al. | 210/401 |
| 2,534,760 | 12/1950 | Ellila | 210/396 |
| 2,720,973 | 10/1955 | Gross | 210/387 |
| 2,720,974 | 10/1955 | Fowler | 210/387 |
| 2,876,904 | 3/1959 | Fowler | 210/387 |
| 3,951,805 | 4/1976 | Dodd | 210/396 |
| 4,057,437 | 11/1977 | Kracklauer | 210/401 |
| 4,426,289 | 1/1984 | Svehaug | 210/403 |
| 4,507,202 | 3/1985 | Nord et al. | 210/403 |

FOREIGN PATENT DOCUMENTS

| | | | |
|---|---|---|---|
| 52-18260 | 2/1977 | Japan | 210/401 |
| 59-166223 | 9/1984 | Japan | 210/403 |

OTHER PUBLICATIONS

Reber, "Advances in Cleaning Systems for Drawing Emulsions", *Wire*, vol. 35, Issue 1, 1985, pp. 32–33.
Compact Conveyor Filter System KBF", Reber Systematic GmbH.
Abmessungen, "Papierband Filter PF".

*Primary Examiner*—Richard V. Fisher
*Assistant Examiner*—Linda S. Evans

[57] ABSTRACT

A filtering device has a one-way filter belt guided by an endless screen support belt in the filtration area through at least 120 degrees on an arcuate path for the formation of a deep liquid inlet area. The supply of liquid occurs in the central portion of this arcuate path. Sludge bars coming to rest on the filter belt prevent sludge accumulations in the liquid inlet area.

6 Claims, 3 Drawing Figures

FILTERING DEVICE FOR SEPARATING SOLIDS FROM LIQUIDS

The present invention relates to a filtering device for separating solids from liquids and comprises a filter belt which, in the filtration area, engages a driven endless screen support belt guided via guide pulleys and is guided on an arcuate path through an angle of at least 120°.

BACKGROUND OF THE INVENTION

It is already known to support the filter belt by a metal or plastic screen belt permeable to liquids in gravity filtration through a filter belt. It is also known in vacuum filtering devices to guide the screen support belt with the filter belt on an arcuate path on the periphery of a drum through an angle of more than 180° (see DE-AS No. 27 00 492). In the latter mentioned device the liquid is drawn off upwardly from the bottom area through the filter belt and the bottom area can rapidly become filled with solids and must be cleaned at short intervals in order to prevent the agglomerating solids from damaging the filter belt. The pure gravity filters have the disadvantage that the liquid to be filtered is only at a relatively low level above the supported filter, accordingly it penetrates the filter belt with low gravity pressure and for coping with large amounts of liquid throughput a correspondingly large and space occupying filter belt surface must be provided in the filtration area.

OBJECT AND STATEMENT OF THE INVENTION

It is the object of the present invention to provide a filtering device of the aforesaid type avoiding the above mentioned disadvantages in such a manner so as to permit a continuous flow filtration undisturbed by the solid components filtered out while saving space.

This object of the invention is obtained with a filtering device of the aforementioned type in that each of two external edges of the strand of the screen support belt which supports the filter belt engages, in the filtration area, the peripheral flange of one or two discs laterally limiting the liquid inlet area and the discs are supported on a common hollow shaft provided with at least one outlet orifice, the liquid to be purified being fed via the hollow shaft.

By guiding the screen support belt covered with the filter belt in the filtration area the liquid fed centrally via the hollow shaft is passed into a relatively deep filter basin, wherein the liquid exerts a pressure accelerating the flow through the filter belt due to the high liquid level. This effect of gravity can even be enhanced by the formation of a vacuum in the discharge space for the filtered liquid located below the filtration area.

In order to prevent an accumulation of solids in the filter basin in the case of intensely dirty liquids and of liquids containing large and fluid solid particles, the filtering device can favorably have sludge catch bars resting against the filter belt between the two corotating discs in the filtration area. These sludge catch bars suitably are supported on the discs in a slot/plug arrangement and limited in the radial direction and prevent solid particles being discharged from sliding or dropping back into the filter basin. A sludge scraper, by means of which coarse solid components or massive accumulations of solids can be removed from the filter belt and discharged into a separate sludge tank, can be additionally disposed at an upper guide point of the screen support belt above the filter belt.

In order to keep the space requirement of the filtering device to a minimum, the endless screen support belt can suitably be returned through the discharge area of the filtered liquid.

BRIEF DESCRIPTION OF THE DRAWINGS

In the following an exemplified embodiment of the invention will be illustrated in detail with reference to the accompanying schematic drawings, in which.

DESCRIPTION OF THE PREFERRED EMBODIMENT

Figure 1:
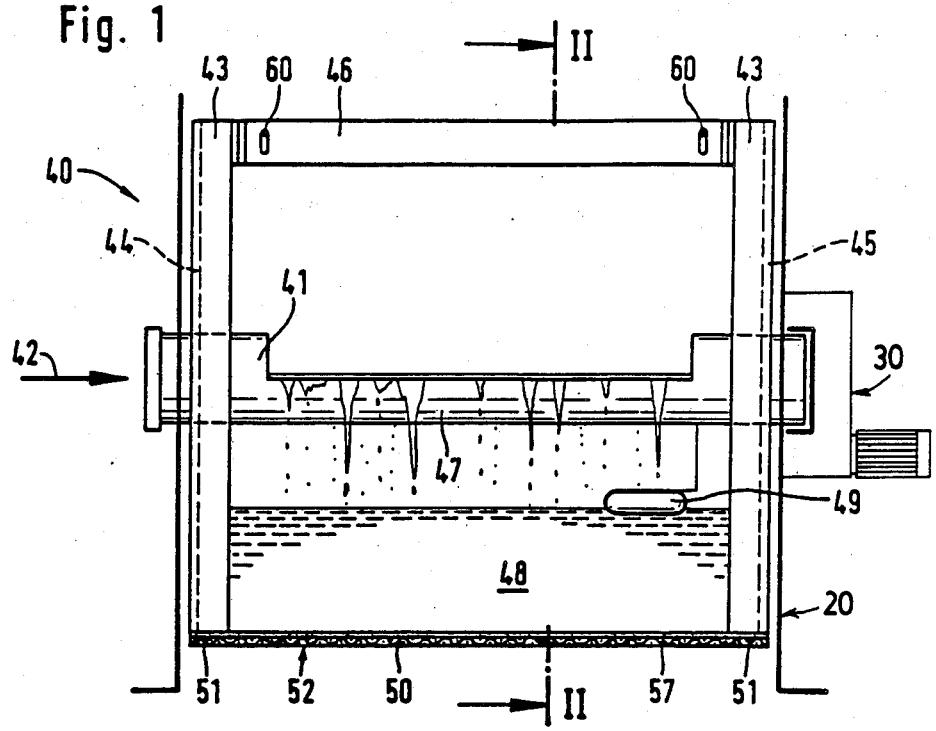
FIG. 1 is a schematic side view of the filtering device.
Figure 2:
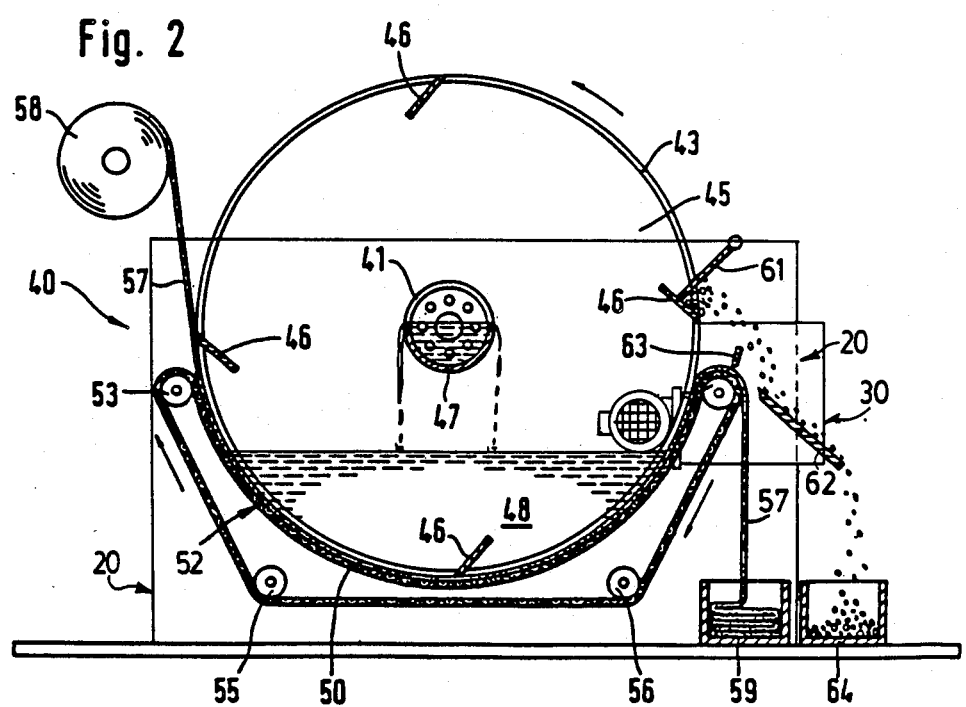
FIG. 2 is a schematic cross section through the device along line II—II of FIG. 1.

In a housing 20, the filtering device 40 illustrated in the drawing has a hollow shaft 41 through which the liquid to be cleaned is fed to the device via the hollow shaft in the direction of the arrow 42 (FIG. 1). Two spaced apart discs 44 and 45 are provided with an external flange 43 and are rotatably mounted on the hollow shaft 41, whereby several sludge scrapers 46 extend between discs 44 and 45. In the area between the two discs 44 and 45 the hollow shaft 41 has a trough 47 obtained by removing a portion of its wall, whereby the dirty liquid delivered flows out over the edge of the trough into the liquid inlet area 48 therebelow. This tub-shaped liquid inlet area 48, wherein the float 49 of a controlling float switch is disposed is limited at the two ends by the discs 44 and 45 and downwardly by a limited strand 50 of an endless screen support belt. This strand abuts at edges 51 against the flanges 43 of the two discs 44 and 45. This endless screen support belt 52 is guided over two upper guide pulleys 53 and 54 disposed slightly below the central plane of the device, whereby the central plane is determined by the hollow shaft, and a via lower guide pulleys 55 and 56. At least one of the guide pulleys 53–56 is driven by drive means 30.

A filter belt 57 moved along by the screen support belt rests on the strand 50 of the screen support belt 52 being drawn off from a delivery spool 58 and is discharged into a storage tank 59 behind the upper guide pulley 54. The filter belt 57 and the screen support belt associated therewith extend over a peripheral area of at least 120° of the discs 44 and 45 laterally limiting the filtration area and form a filtering area over this entire area above which the liquid to be purified resides in the tub-like inlet area 48 with a relatively high liquid level. The endless screen support belt is guided back by the upper guide pulley 54 through the outlet area of the filtered liquid below the strand 50 to the upper guide pulley 53.

The sludge catch bars 46 are mounted in a slot/plug arrangement with their ends against the discs 44 and 45 for limited movement in the radial direction. This is indicated in FIG. 1 by longitudinal slotted holes 60 at the points of attachment. In the filtration area to the sludge catch bars can thus lean against the filter belt 57 under their own weight and can seize solid particles sliding off the filter belt 57, which ascends in a direction towards the upper guide pulley 54, whereby these solid particles are then dropped above the guide pulley 54 by a stripper 61 onto a chute 62. Furthermore, a scraper 63 with which accumulations of dirt are removed from the filter belt 57 and are also passed via the chute 62 into a separate sludge tank 64, is disposed above the upper guide pulley 54.

In order to increase the amount of liquid throughput in the filtration area, the liquid outlet area below the strand 50 of the screen support belt through which the screen support belt is guided can be put under negative pressure.

Figure 3:
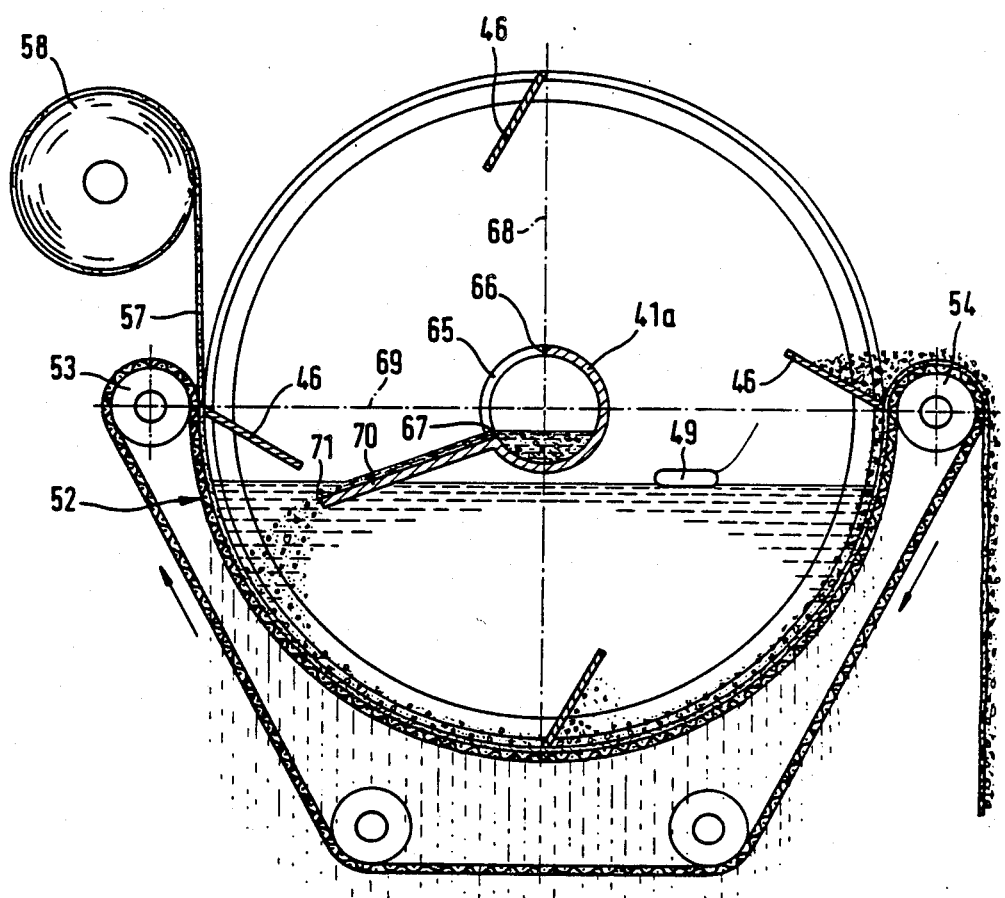
FIG. 3 is a schematic cross section through a modified exemplified embodiment of the filtering device in accordance with FIG. 2

FIG. 3 illustrates a modified embodiment of the filtering device. In this embodiment the hollow shaft 41a is provided with an outlet orifice 65 in the form of an elongated slot on its side facing the inlet side of the filter belt 57, whose longitudinal edge 66 of the outlet orifice 65 extends in the verticle central plane of the hollow shaft, indicated by the dotdash line 68, while its lower longitudinal edge 67 extends paraxially below the horizontal central plane of the hollow shaft 41a, indicated by the dot-dash line 69. An outwardly inclined trailing wall 70 is linked up with the lower longitudinal edge 67 and ends spaced apart from the path of the filter belt 57 and of the screen support belt 52. The dirty fluid fed via the hollow shaft 41a is passed via the trailing wall 70 up to the initial area of the filter belt 57. The free outer edge 71 of the trailing wall 70 is so designed that the sludge catch bars 46 do not strike against the trailing wall 70.

I claim:

1. A filtering device for separating solids from liquids by a gravity filtration process, comprising a housing;

two circular discs spaced from each other in coaxial arrangement and rotatably mounted in said housing with a horizontally oriented axis of rotation, each of said discs having a peripheral flange;

a delivery spool rotatably mounted on said housing with an axis of rotation parallel to said axis of rotation of said discs;

a filter belt having a pair of space-apart edges, an end supported by said delivery spool, and a portion unwrapped from said delivery spool;

a plurality of guide pulleys rotatably mounted in said housing with axes of rotation parallel to said axis of rotation of said discs;

an endless screen support belt having parallel spaced-apart edges arranged and adapted to be guided by said guide pulleys to form an upper strand and a lower strand;

drive means for driving said endless screen support belt;

said upper strand of said endless screen support belt supporting said unwrapped portion of said filter belt and pressing said spaced-apart edges of said filter belt against said peripheral flanges of said discs over an arcuate angle of at least 120 degrees, forming with said two discs a half drum-like filter chamber that is open upwards;

said lower strand of said endless screen support belt returning through the filtered liquid;

sludge catch bars mounted on said discs to rotate with said discs, extending from and between said discs and arranged to contact said filter belt in said filter chamber;

a conduit for charging an unfiltered liquid mixture into said filter chamber; and a float switch disposed in the area of said filter chamber for detecting the liquid level therein.

2. A filtering device according to claim 1, wherein said drive means is mounted on said housing for rotationally driving one of said guide pulleys for said endless screen support belt.

3. A filtering device according to claim 1 wherein said sludge catch bars are mounted on said discs in slot/plug arrangement for limited movement in a radial direction with respect to said discs.

4. A filtering device according to claim 1, comprising a hollow shaft having one end connected to said conduit, a closure at its other end, and means defining an outlet orifice in its central region for charging unfiltered liquid mixture therethrough into said filter chamber, said discs being rotatably mounted on said hollow shaft.

5. A filtering device according to claim 4, wherein said outlet orifice comprises means defining a longitudinal slot in the top of said hollow shaft facing said delivery spool.

6. A filtering device according to claim 5, wherein said longitudinal slot has a lower axially-aligned edge linked with a radially and slightly downward inclined trailing wall which terminates at a small distance from said unwrapped portion of said filter belt.

* * * * *